United States Patent
Gutruf et al.

(10) Patent No.: US 10,189,463 B2
(45) Date of Patent: Jan. 29, 2019

(54) FUEL CELL RANGE EXTENDER

(71) Applicant: MAGNA STEYR Fahrzeugtechnik AG & Co KG, Graz (AT)

(72) Inventors: Philipp Gutruf, Munich (DE); Julian Goellner, Graz (AT); Michael Martin, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 142 days.

(21) Appl. No.: 15/346,056

(22) Filed: Nov. 8, 2016

(65) Prior Publication Data

US 2017/0144647 A1   May 25, 2017

(30) Foreign Application Priority Data

Nov. 25, 2015 (EP) ..................... 15196234
Apr. 27, 2016 (EP) ..................... 16167254

(51) Int. Cl.
| | |
|---|---|
| *B60W 20/10* | (2016.01) |
| *B60K 6/32* | (2007.10) |
| *B60L 11/18* | (2006.01) |
| *H01M 8/04* | (2016.01) |
| *H01M 16/00* | (2006.01) |

(Continued)

(52) U.S. Cl.
CPC ............ *B60W 20/10* (2013.01); *B60K 6/32* (2013.01); *B60L 11/1881* (2013.01); *B60L 11/1885* (2013.01); *B60L 11/1887* (2013.01); *B60W 20/00* (2013.01); *H01M 8/04298* (2013.01); *H01M 8/04932* (2013.01); *H01M 16/006* (2013.01); *B60Y 2200/92* (2013.01); *B60Y 2400/202* (2013.01); *H01M 2220/20* (2013.01); *H01M 2250/20* (2013.01);

(Continued)

(58) Field of Classification Search
CPC .. H02K 7/025; H02K 7/09; H02P 9/02; F16C 32/0497; F16C 2380/28; Y02E 60/16
See application file for complete search history.

(56) References Cited

U.S. PATENT DOCUMENTS

| | | | | |
|---|---|---|---|---|
| 2012/0321917 A1* | 12/2012 | Kazuno | ............... | H01M 16/006 429/9 |
| 2013/0040219 A1* | 2/2013 | Naganuma | ........ | H01M 8/04014 429/429 |
| 2014/0336855 A1* | 11/2014 | Kwon | ................. | B60L 11/1885 701/22 |

FOREIGN PATENT DOCUMENTS

| | | |
|---|---|---|
| CN | 101612939 A | 12/2009 |
| CN | 102714335 A | 10/2012 |

(Continued)

OTHER PUBLICATIONS

Machine Translation of DE 10 2013 207244 retrieved from espacenet on Jun. 25, 2018 (Year: 2018).*

(Continued)

*Primary Examiner* — Thomas Ingram
(74) *Attorney, Agent, or Firm* — Jordan IP Law, LLC; Todd A. Vaughn

(57) ABSTRACT

A hybrid vehicle having an electric drive with a power accumulator, a fuel cell, and a control unit configured to control the operation of the fuel cell. The control unit has logic, at least partially including hardware configured to activate and deactivate the fuel cell as a function of a first characteristic map having a first input variable representing a present power demand of the hybrid vehicle which exists over a first defined observation time range.

17 Claims, 13 Drawing Sheets

(51) Int. Cl.
  *B60W 20/00* (2016.01)
  *H01M 8/04858* (2016.01)
  *H01M 8/04298* (2016.01)

(52) U.S. Cl.
  CPC .............. *Y02T 90/32* (2013.01); *Y02T 90/34* (2013.01); *Y10S 903/908* (2013.01); *Y10S 903/944* (2013.01)

(56) References Cited

FOREIGN PATENT DOCUMENTS

| | | | |
|---|---|---|---|
| CN | 103373237 | A | 10/2013 |
| CN | 104139709 | A | 11/2014 |
| DE | 4422636 | A1 | 1/1996 |
| DE | 102007051819 | A1 | 7/2008 |
| DE | 102013207244 | A1 | 10/2013 |

OTHER PUBLICATIONS

Office Action for Chinese Patent Application No. 201611060605.5, dated Oct. 8, 2018, 10 pages including 5 pages of English translation.

\* cited by examiner

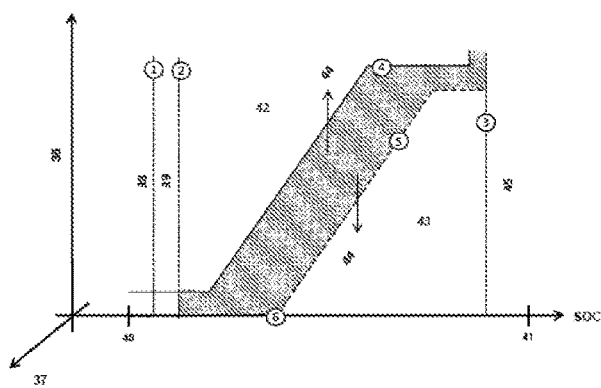
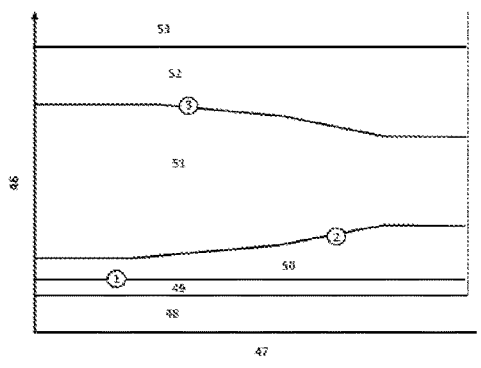
Fig. 6
Fig. 7

FUEL CELL RANGE EXTENDER

CROSS-REFERENCE TO RELATED APPLICATIONS

The present application claims priority 35 U.S.C. § 119 to European Patent Publication Nos. EP 15196234.7 (filed on Nov. 25, 2015) and EP 16167254.8 (filed on Apr. 27, 2016), which are each hereby incorporated by reference in their complete, respective entireties.

TECHNICAL FIELD

Embodiments relates to a hybrid vehicle having an electric drive with a power accumulator, a fuel cell, and a control unit configured to control the operation of the fuel cell. Embodiments also relate to a method for operating a fuel cell of such a hybrid vehicle.

BACKGROUND

Methods for operating a fuel cell of a hybrid vehicle, wherein the hybrid vehicle comprises an electric drive having a power accumulator and also the fuel cell, as an additional power source, are known per se.

Such hybrid vehicles use at least one electric motor as a drive and a fuel cell as an additional power source to extend the range of the vehicle. The fuel cell therefore represents a so-called "range extender" of the hybrid vehicle. The drive of such a vehicle can be performed, for example, primarily or exclusively via the electric drive. In any case, the fuel cell can be used to charge the power accumulator of the electric drive, to thus increase the range of the electric travel. The vehicle can possibly also be driven directly via the fuel cell, depending on its construction.

In comparison to hybrid vehicles having an internal combustion engine, serious differences occur in vehicles having a fuel cell. For instance, the optimization of the efficiency of the auxiliary drive is not so relevant, because the efficiency of a fuel cell is nearly constant on a broad power range. Also, the optimization to the dynamic response of the auxiliary drive is more important, because, to lengthen the service life, a fuel cell cannot be operated dynamically comparably to an internal combustion engine.

Frequently turning a fuel cell on and off can additionally shorten the service life. Therefore, an operating strategy of a hybrid vehicle having internal combustion engine cannot simply be assumed for vehicles having fuel cells. Frequent turning on and off, for example, as in start-stop traffic or when recuperating energy and also high dynamic response, corresponding to the driver command, would have negative effects on the service life.

The operating strategy of the fuel cell during travel should therefore have as little dynamic response as possible and few on/off cycles, to take into consideration the characteristics of the fuel cell.

In addition, there is the power provision by the fuel cell in the form of a range extender (also referred to as REX hereafter). In the case of a range extender, the power of the REX is less in principle than that of the drive engines. If the battery, the power accumulator of the electric drive, is empty, it is not possible to travel with full power, but rather only with the power of the REX. Because this is accompanied by losses or limitations in the drivability, this state should be avoided. Therefore, before phases having high power demand, the power has to be collected/buffered by the REX in the battery in a timely manner, to thus avoid the power deficit of the REX and/or not let it become perceptible to the driver.

In addition, fuel cells always have a minimum power not equal to zero in operation in principle. That is to say, an "idle" as in the case of internal combustion engines is not possible in fuel cells. In particular in city regions, this is problematic if the average power demand of the vehicle is less than the minimum power of the fuel cell. In this case, this would result in continuous charging of the battery.

SUMMARY

Embodiments relate to a method for operating a fuel cell of a hybrid vehicle that includes an electric drive having a power accumulator, and the fuel cell, the method taking into consideration the technical properties of fuel cell systems as an auxiliary drive and/or as an additional energy source and of electric drives, in particular the less dynamic power provision of fuel cells.

Embodiments relate to a method for operating a fuel cell of a hybrid vehicle that includes an electric drive having a power accumulator, and a fuel cell configured to charge the power accumulator, the method comprising activating and deactivating the fuel cell as a function of a first characteristic map having a first input variable representing a present power demand of the hybrid vehicle which exists over a first observation time range.

In accordance with embodiments, for optimum operation of a fuel cell in a range extender vehicle, the fuel cell is turned activated and deactivated, i.e., turned on and off, primarily as a function of a present power demand of the hybrid vehicle. The power demand, however, is not measured or calculated by a single instantaneous value, but rather is considered over a specific observation time range, for example, several seconds or minutes. Activation or deactivation of the fuel cell only takes place upon application of a sufficiently high or low instantaneous or average power demand over this entire observation time range.

In accordance with embodiments, therefore, a predictive system is not used to ascertain the future power demand. Instead, a present power demand, which considers the immediate past, is used as the basis to control the fuel cell range extender accordingly, i.e., to start or stop it, or to activate or deactivate it.

In accordance with embodiments, a characteristic map means at least a two-dimensional characteristic map in accordance with embodiments, i.e., a characteristic curve, but particularly a multidimensional characteristic map. The first characteristic map is also called characteristic map A.

In accordance with embodiments, the fuel cell is activated and/or deactivated at least as a function of a characteristic curve. The input variable of the characteristic curve is the present power demand of the hybrid vehicle, which exists over a first defined observation time range.

In accordance with embodiments, the present power demand particularly takes into consideration in this case both the power demand for the drive of the vehicle and also possible power demands of secondary consumers and/or secondary assemblies.

In accordance with embodiments, the electrical power accumulator of the vehicle which is chargeable by the fuel cell and the energy of the power accumulator may be used at least, inter alia, to also drive the hybrid vehicle and to supply auxiliary assemblies.

In accordance with embodiments, the first defined observation time range is between 1 second and multiple minutes.

Alternatively, the first defined observation time range may be up to 5 minutes. The first defined observation time range may be between 1 second and 60 seconds. The first defined observation time range may be between 3 and 20 seconds.

In accordance with embodiments, a second input variable of the first characteristic map is particularly a present charge state of the power accumulator.

In accordance with embodiments, a third input variable of the first characteristic map is particularly a present vehicle velocity.

In accordance with embodiments, the present vehicle velocity, as the input variable of the first characteristic map, may be a vehicle velocity existing over a second defined observation time range. The second defined observation time range may be between 1 second and multiple minutes. The second defined observation time range may be up to 5 minutes. The second defined observation time range may be between 1 second and 30 seconds. The second defined observation time range may be between 2 and 20 seconds.

In accordance with embodiments, the first characteristic map may have at least one first hysteresis, so that the characteristic curve for activating the fuel cell as a function of the first variable is different from the characteristic curve for deactivating the fuel cell as a function of the first input variable, i.e., the limiting value for activating the fuel cell differs at equal present value of the input variable, i.e., the present time-filtered power demand, from the limiting value for deactivating the fuel cell.

In accordance with embodiments, the fuel cell, if activated, may be operated with a requested power, which is a function of a second characteristic map, wherein a first input variable of the second characteristic map is a present power request by a driver of the hybrid vehicle.

In accordance with embodiments, the second characteristic map can again be two-dimensional or multidimensional, and can therefore be a characteristic curve. The second characteristic map is also referred to as characteristic map B.

In accordance with embodiments, the first input variable of the second characteristic map may be a present power request existing over a third defined observation time range. The third defined observation time range may be between 1 second and multiple minutes. The third defined observation time range may be up to 5 minutes. The third defined observation time range may be between 1 second and 60 seconds. The third defined observation time range may be between 3 and 20 seconds.

In accordance with embodiments, the second characteristic map particularly has at least one hysteresis, so that the characteristic curve for increasing the requested power of the fuel cell as a function of the first input variable is different from the characteristic curve for reducing the requested power of the fuel cell as a function of the first input variable.

In accordance with embodiments, the characteristic curve for increasing the requested power of the fuel cell as a function of the first input variable is particularly formed stepped, to reduce the dynamic response.

In accordance with embodiments, a second input variable of the second characteristic map can be a present charge state of the power accumulator.

DRAWINGS

Embodiments will be illustrated by way of example in the drawings and explained in the description below.

FIG. 1 illustrates a diagram of the characteristic of a fuel cell, in accordance with embodiments.

FIG. 2 schematically illustrates the power supply on board a hybrid vehicle having a fuel cell, in accordance with embodiments.

FIG. 3 schematically illustrates an objective of a method, in accordance with embodiments.

FIG. 6 illustrates a first characteristic map for a method, in accordance with embodiments.

FIG. 7 illustrates characteristic curves of a possible dependence of the first characteristic map on the vehicle velocity, in accordance with embodiments.

Figure 13:
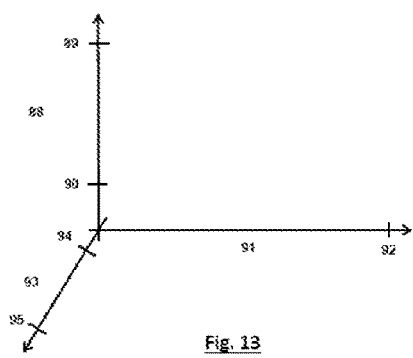

FIG. 13 schematically illustrates a two-dimensional second characteristic map, as a function of the charge state of the power accumulator, in accordance with embodiments.

Figure 14:
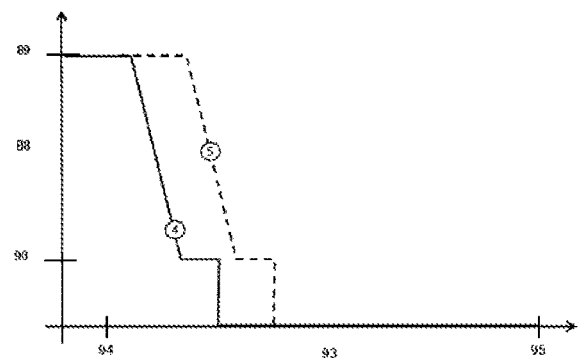

FIG. 14 illustrates a third characteristic map and/or a third characteristic curve for a method, in accordance with embodiments.

Figure 15:
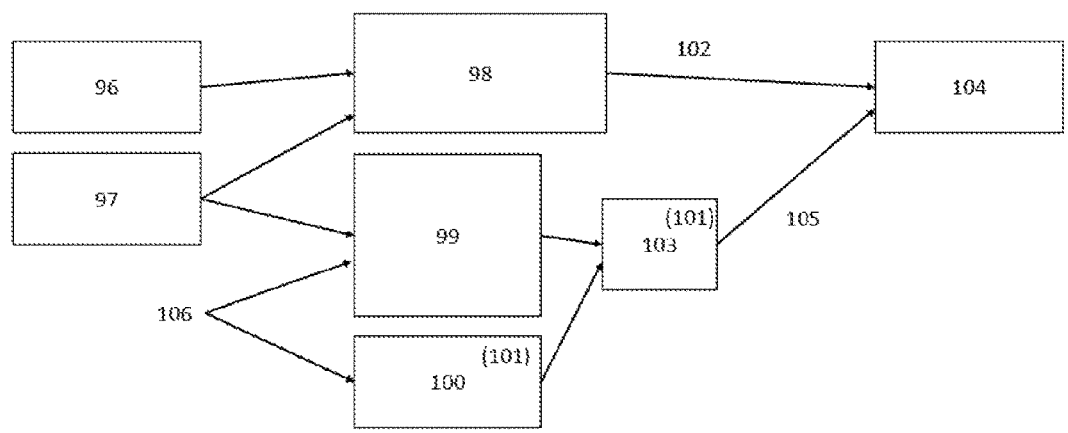

FIG. 15 illustrates modules in a control device of a hybrid vehicle, in accordance with embodiments.

Figure 16:
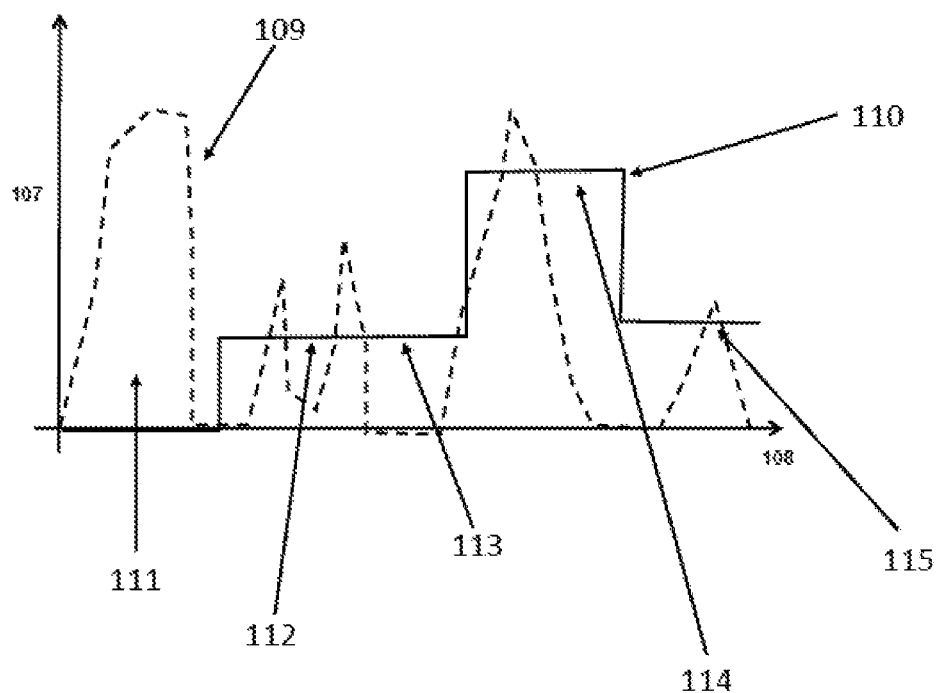

FIG. 16 illustrates a result of a method, in accordance with embodiments.

DESCRIPTION

Figure 1:
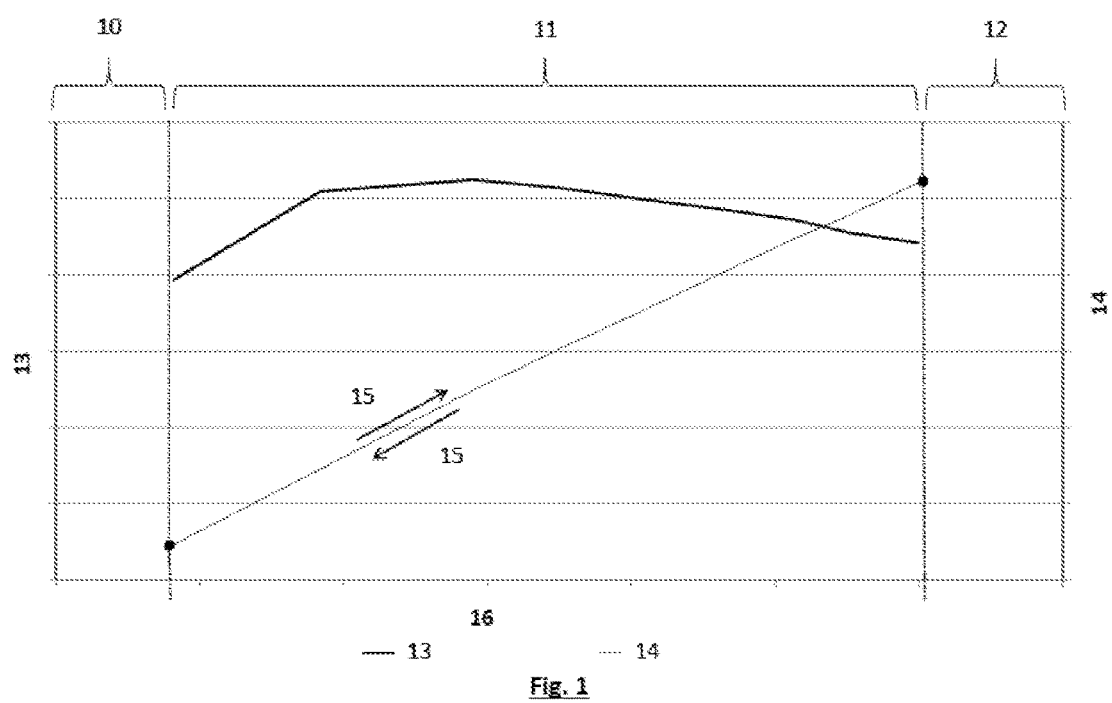

As illustrated in FIG. 1, a diagram of the characteristic of a fuel cell, in which the net power (thin line) is approximately illustrated on the Y axis in relation to the required gross power of the fuel cell on the X axis of the diagram, and the efficiency (thick line) of the fuel cell, also on the Y axis. Reference 10 on the diagram represents no operation (will only occur during activation/deactivation), reference 11 represents operation, reference 12 represents no operation (power limit of the fuel cell), reference 13 represents efficiency, reference 14 represents net power [kW], reference 15 represents gradient, and reference 16 represents gross power [kW].

A fuel cell displays the following differences or characteristics in comparison to a conventional internal combustion engine, also referred to as an ICE hereafter. Nearly constant efficiency over a broad power range (except at very low and very high powers). The optimization of the operating strategy to an efficiency-optimum point is therefore not of great significance. The power change is a function of the power gradients or current gradients. A fuel cell is not operable as dynamically as an ICE, in addition, a high dynamic response is at the cost of service life. Fuel cells always have a minimum power emission. There is no "idle"

as with an ICE, but rather only OFF, i.e., turned off, or a power greater than a minimum power.

Figure 2:
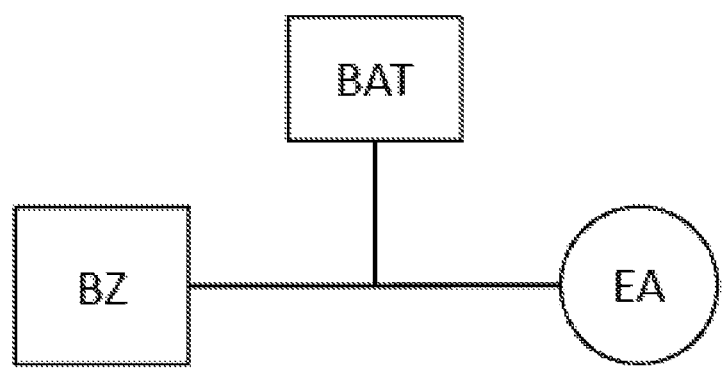

As illustrated in FIG. 2, a hybrid vehicle having a fuel cell BZ as a range extender, also referred to as REX hereafter. A battery-electrical REX having fuel cell BZ comprises an electric drive train EA, having one or more electric motors, a battery or power accumulator BAT, and one (or multiple) fuel cells BZ. The primary power for supplying the electric motors comes from the battery BAT. The fuel cell BZ and/or the REX is used for range extension. The dimensioning of the electric motor power is higher than the maximum power of the REX, i.e., the fuel cell. The REX only has to provide the average power, the power peaks are absorbed via the battery (the power accumulator). If the battery is empty or discharged and almost can no longer provide power, the power of the drive motors is restricted to the power of the REX.

Requirements which can be achieved by the invention in accordance with at least some embodiments are as follows. Changing the operating state of the fuel cell as little as possible (low dynamic response, few on/off cycles) and/or keep it constant if possible. Balancing the power provision (avoid (deeply) discharged battery). Optimizing efficiency, operation in the moderate power range. Moreover, no predictive systems are provided.

Advantageously, in accordance with embodiments, utilizing the electrical energy of the battery is in the foreground, because presently the infrastructure for charging the battery is built out better than that for refilling the fuel tank of the fuel cell (for example, with hydrogen). In addition, the fuel cell is turned on and off as little as possible. The latest possible turning on and least possible usage of the fuel cell until shutdown of the vehicle would be an optimum goal. However, the above-mentioned requirements have to be taken into consideration.

There are two limiting cases for a range extender system. First, city travel, in which required average power is less than the minimum power of the fuel cell. The vehicle should take energy from the battery as long as possible without using the fuel cell. The fuel cell should first be used or activated at low SOC (state of charge, charge state of the power accumulator). Secondly, highway travel in which required average power is greater than the maximum power of the fuel cell. The fuel cell has to be started immediately to take energy from battery and fuel cell as long as possible and/or to avoid excessively rapid discharge of the battery.

In principle, this problem may be solved, as is known in the prior art, via operating strategies based on items of information from navigation systems. However, because predictive systems are not used here, the start of the fuel cell has to be estimated on the basis of the average power demand of the last X seconds.

Figure 3:
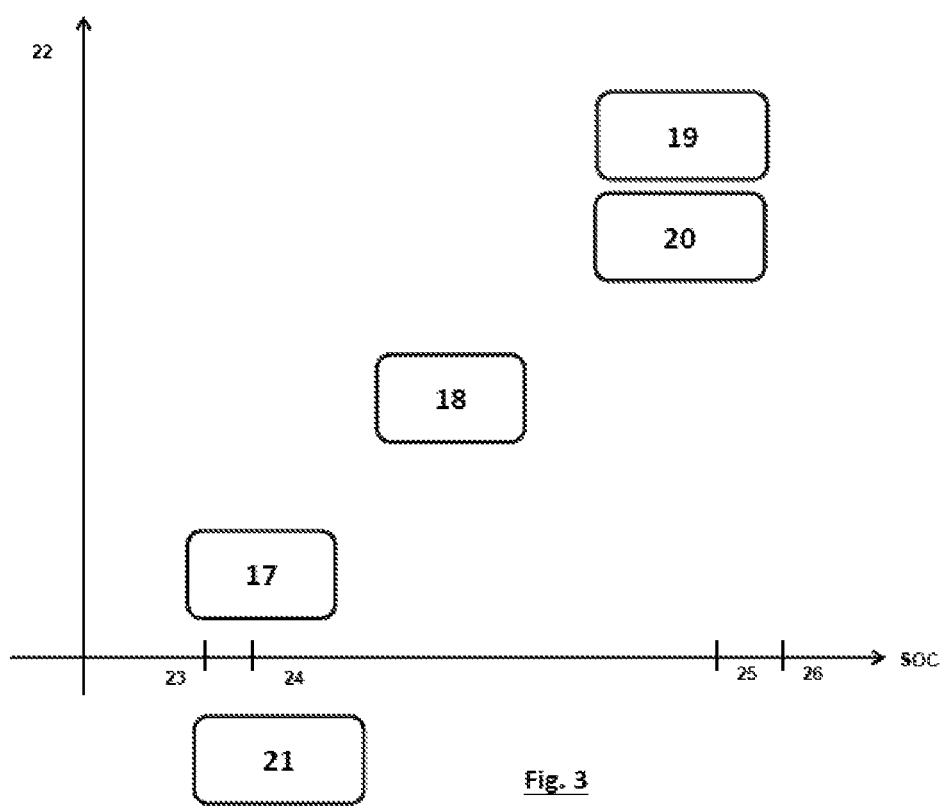

As illustrated in FIG. 3, the operating strategy in accordance with embodiments is provided roughly on the basis of various ranges. Reference 22 represents power demand, reference 23 represents SOC Minimum, reference 24 represents FC Start, reference 25 represents FC Stop, and reference 26 represents SOC Maximum. During city travel (City, 17), first start the fuel cell at lower battery. For overland travel (Extra Urban, 18), start the fuel cell at moderate SOC. For highway travel (Highway, 19), start fuel cells immediately (even at high SOC). For long hill ascent (Uphill, 20), start fuel cells immediately (even at high SOC). For long hill descent (Downhill, 21), never start fuel cell or only at very low SOC. This context is superimposed with the usage of secondary consumers by the driver (heating, air conditioning) and the powers required for this purpose.

In accordance with embodiments, the primary input variable for the method is not the average velocity in this case. Via analysis of the velocity, the states city, overland, and highway could possibly also be detected, but not uphill and downhill phases. Furthermore, a fuel cell vehicle is a "zero emission vehicle," which means that no pollutant emissions are locally produced, as with an internal combustion engine. This in turn means that local emission-free travel is always possible, for example, in a city. A separate recognition of city travel therefore does not play a substantial role.

The filtered electrical power demand of the system, i.e., of electric drive and secondary consumers, is therefore used as the primary input variable, i.e., a present power demand of the hybrid vehicle, which exists over a first defined observation time range. Hill ascents and hill descents may also be recognized using this input variable.

Figure 5:
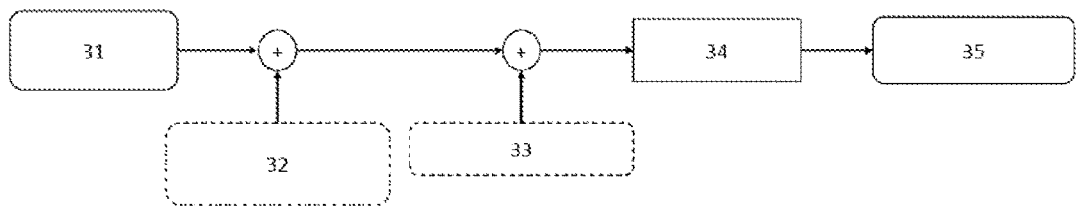
FIG. 5 illustrates a flow chart of a second variant of a reference power determination, in accordance with embodiments.

As illustrated in FIGS. 5 and 6, this input variable, the present filtered power demand, the reference power, can be calculated via the following paths depending on the signal availability.

Figure 4:
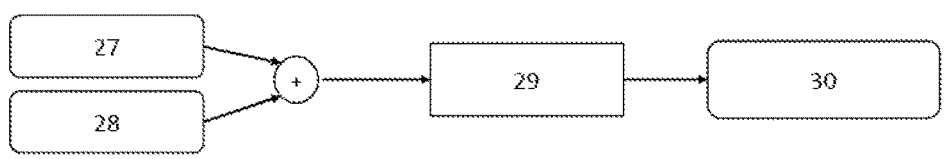
FIG. 4 illustrates a flow chart of a first variant of a reference power determination, in accordance with embodiments.

As illustrated in FIG. 4, a flow chart of a first variant of a reference power determination, in accordance with embodiments. Reference 27 represents power battery, reference 28 represents power fuel cell, reference 29 represents filter over X seconds, and reference 30 represents filtered reference power. It is calculated on the basis of the power balance from battery and fuel cell which power drops off in secondary consumer and electrical attraction drive. The total instantaneous power is filtered over the predefined observation time range, X seconds, so that short-term variations do not result in activation or deactivation of the fuel cell.

FIG. 5 illustrates a flow chart of a second variant of a reference power determination. Reference 31 represents power of electrical traction drives, reference 32 represents power DCDC low volt (for example 12 V system), reference 33 represents power of diverse HV consumers, reference 34 represents filter over X seconds, and reference 35 represents filtered reference power.

In accordance with embodiments, the power demand is calculated directly from the applied electrical power at the electrical traction drives and at the secondary consumers. Filtering is again performed over the observation time range, i.e., X seconds. The formulations "filtering" over an observation time range or present input variables ascertained over a first, second, or third defined observation time range are to be understood broadly here and are to be understood to include, for example, an average over a shorter or longer defined time range or a sliding average of previously detected values of an input variable with the present last value of this input variable or any other type of mathematical linkage of the values of the input variables, or similarly filtering of at least one preceding value of an input variable with the present last value of this input variable.

Figure 9:
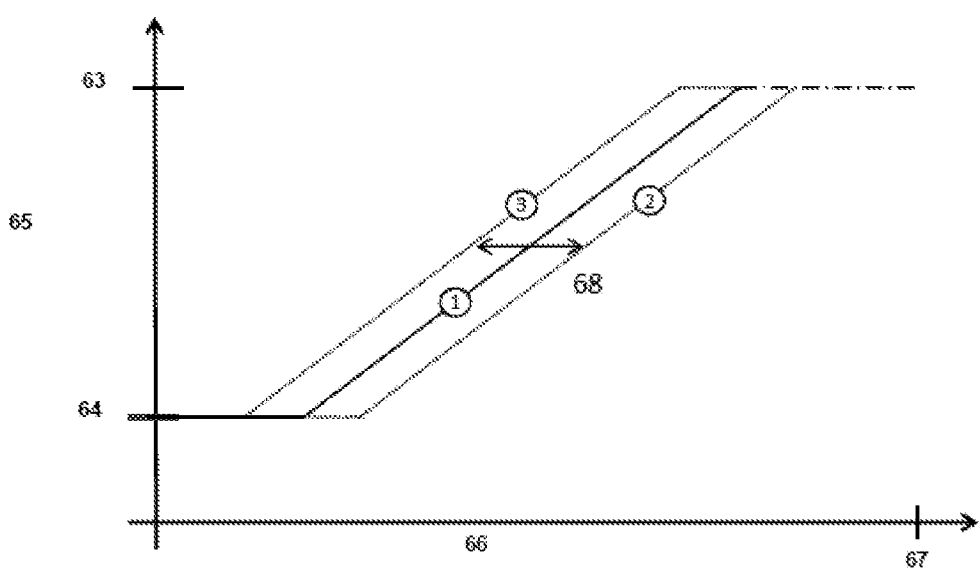
FIG. 9 illustrates a second characteristic map for a method, in accordance with embodiments.
Figure 11:
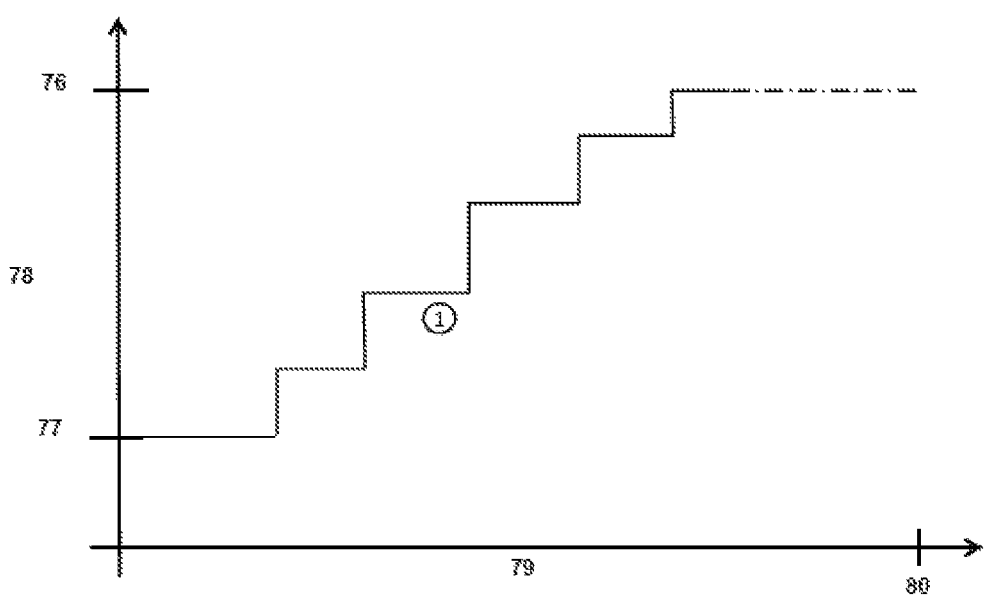
FIG. 11 illustrates a second characteristic map, in accordance with embodiments.
Figure 12:
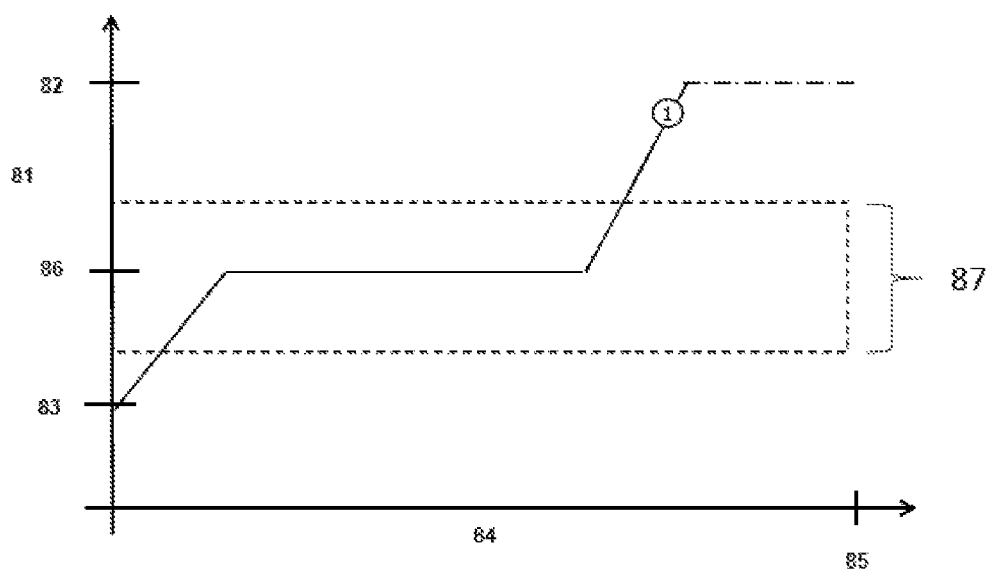
FIG. 12 illustrates a second characteristic map, in accordance with embodiments.

In accordance with embodiments, the operating strategy is particularly defined by two characteristic maps. The first characteristic map, as illustrated in FIG. 6, describes when the fuel cell is activated or deactivated in general. The second characteristic map, as illustrated in FIGS. 9, 11, and 12, describes with which power the fuel cell is operated.

As illustrated in FIG. 6, the first characteristic map, the threshold values for the reference power (present filtered power demand) for activating and deactivating the fuel cell (Y axis), as a function of the charge state (SOC) of the power accumulator. Reference 36 represents filtered power demand, reference 37 represents vehicle velocity, reference 38 represents limited mode, reference 39 represents fuel cell charging=f(F−velocity), reference 40 represents SOC Minimum, reference 41 represents SOC Maximum, reference 42 represents FC activation, reference 43 represents FC deactivation, reference 44 represents hysteresis, and reference 45 represents Fuel cell off=f(F−velocity).

The first characteristic map is defined by the following characteristic curves. The battery is defined by a usable capacity, the operating range is between a minimum charge state SOC_Min and a maximum charge state SOC_Max (SOC=State of charge=charge state of the battery). In characteristic curve 1, below a defined SOC, the fuel cell is always operated with maximum possible power to avoid excessively deep discharge of the battery. In characteristic curve 2, below a further defined SOC, which can be a function of the vehicle velocity, the fuel cell is also activated without considering the present filtered power demand. In characteristic curve 3, above a further defined SOC, which can again be a function of the vehicle velocity, the fuel cell is deactivated (to keep storage free for possible recuperation energy). In characteristic curve 4, above a defined reference power, which is dependent on the SOC, i.e., the charge state of the power accumulator, the fuel cell is activated. In characteristic curve 5: below a further defined reference power, which is a function of the SOC, i.e., the charge state of the power accumulator, the fuel cell is deactivated. However, it remains active at least until at least SOC value 6 is reached and is turned off at latest when characteristic curve 3 is reached. Characteristic curve 5 represents a hysteresis in relation to power and SOC, i.e., the charge state, to avoid excessively frequent turning on and off of the fuel cell.

In accordance with embodiments, the input variables for this method are: filtered power demand (over X seconds), and filtered vehicle velocity (over X seconds).

In principle, all characteristic curves are defined as 1D characteristic curves (1 input variable) to keep the storage requirement, application expenditure, and programming effort low. Furthermore, however, the characteristic curves 4 and 5 can also be defined as 2D characteristic curves (input variable power and velocity). This offers the advantage of a further hysteresis additionally related to the vehicle velocity.

In addition, there is furthermore a time hysteresis of X seconds. For example, if the power is only briefly below characteristic curve 5 and goes back above this characteristic curve after y seconds, wherein y<X, the fuel cell remains active.

As illustrated in FIG. 7, a possible dependence of the activation and deactivation of the fuel cell on the vehicle velocity and on the charge state (SOC) of the power accumulator. Reference 46 represent HV battery SOC, 47 represent vehicle velocity, reference 48 represent Forbidden zone (no discharging allowed), reference 49 represent Limited Mode, reference 50 represent fuel cell charging=f(F−velocity), reference 51 represent Determination fuel cell activation/deactivation, reference 52 represent fuel cell off=f (F−velocity), and reference 53 represent Forbidden zone (no charging allowed). In this case, the characteristic curves 1, 2, and 3 of FIG. 6 are again illustrated. The characteristic curves 2 and 3 are velocity-dependent. A range, which varies in width depending on the vehicle velocity, of the determination according to the invention of the activation or deactivation of the fuel cell, extends between the characteristic curves 2 and 3, depending on the filtered power demand, i.e., the present power demand of the hybrid vehicle which exists over a first defined observation time range.

Figure 8A:
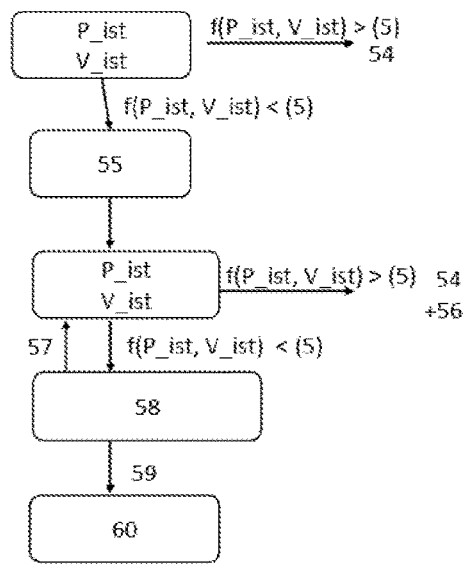
FIG. 8 illustrates two schematic flow charts for the consideration of an observation time range, in accordance with embodiments.
Figure 8B:
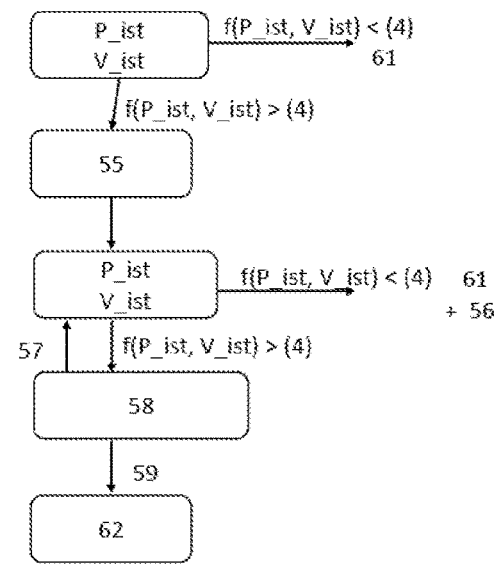

As illustrated in FIG. 8, two schematic flow charts for the consideration of the observation time range (x seconds), on the left in a state in which the fuel cell is already activated, and therefore the deactivation of the fuel cell is checked, on the right in a state in which the fuel cell is deactivated, and therefore the activation of the fuel cell is checked. Reference 54 represents fuel cell remains active, reference 55 represents start timer, reference 56 represents stop timer, reference 57 represents no reference 58 represents timer expired (after x seconds), reference 59 represents yes, reference 60 represents stop fuel cell, reference 61 represents fuel cell remains inactive, and reference 62 represents start fuel cell.

On the illustration in FIG. 8(*a*), the fuel cell is initially active. It is checked whether value f (P_ist, V_ist) formed from the present, instantaneous power demand P_ist and the present, instantaneous vehicle velocity V_ist is less than the limiting value predefined by the characteristic curve 5 (see FIG. 6). If this is not the case, the fuel cell remains active. Otherwise, a timer is started and it is checked continuously for X seconds whether the indicated instantaneous power demand f (P_ist, V_ist) has in the meantime become greater than the limiting value again, whereupon a deactivation of the fuel cell would not occur. The fuel cell is actually stopped, i.e., deactivated, only if the limiting value has never been exceeded until the expiration of the timer, i.e., after X seconds.

Similarly, in FIG. 8(*b*), with deactivated fuel cell, it also waits X seconds as to whether the value falls below the characteristic curve 4 (see FIG. 6). The fuel cell is only activated after X seconds when this is not the case. The observation time range X for the activation of the fuel cell can also be different from the observation time range X for the deactivation of the fuel cell.

As illustrated in FIG. 9, an example of a second characteristic map in accordance with embodiments. Reference 63 represents max FC power, reference 64 represents min FC power, reference 65 represents requested fuel cell power, reference 66 represents driver power request, reference 67 represents max powertrain system power, and reference 68 represents hysteresis.

The second characteristic map is described by the following characteristic curves. The driver command/the driver command power is limited by the maximum power availability of the electric drivetrain. The possible fuel cell power is defined by a maximum and a minimum fuel cell power. An "idle" as in an internal combustion engine is not possible.

In characteristic curve 1, the requested power of the fuel cell is defined by a function which is dependent on the present power demand by a driver of the hybrid vehicle, f (driver command), which can be requested in particular via a gas pedal or accelerator pedal by the driver. In characteristic curve 2 and characteristic curve 3, a hysteresis can be defined by a fixed value, or a function can be defined depending on the present power demand (f (driver command)) for the hysteresis between characteristic curve 2 and characteristic curve 3. The hysteresis is necessary to keep the dynamic response of the fuel cell (frequent change of the power request) low. The phases in which the fuel cell is operated over a longer time at constant power are therefore lengthened. Also, as described above for the flow chart of FIG. 8, the power change can also have a time hysteresis superimposed (as illustrated in FIG. 10).

Figure 10:
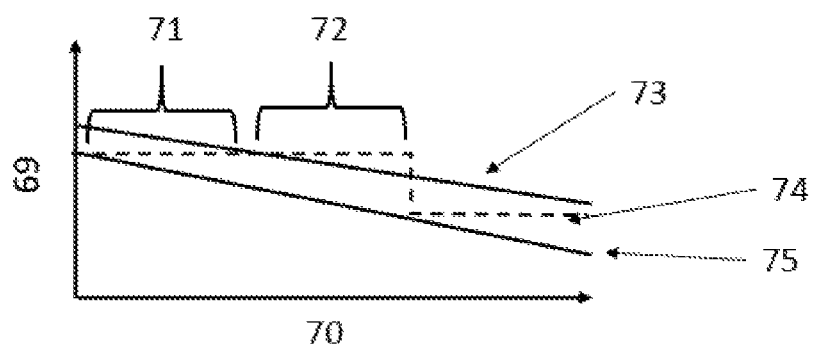
FIG. 10 illustrates possible effects of a time hysteresis on the power to be emitted by the fuel cell, in accordance with embodiments.

As illustrated in FIG. 10, the possible effects of such a time hysteresis on the power to be emitted by the fuel cell. The power directly requested by the driver (straight line at top), the requested power of the fuel cell calculated according to characteristic curve 1 without hysteresis according to FIG. 9 (straight line at bottom), and the requested power calculated with time hysteresis (stepped line), which enables a reduced dynamic response of the fuel cell, are illustrated.

Reference 69 represents power, reference 70 represents time, reference 71 represents hysterese characteristic curve 3, reference 72 represents hysterese time, reference 73 represents power, driver command, reference 74 represents power, fuel cell with hysteresis, and reference 75 represents power of fuel cell according to characteristic curve 1 without hysteresis.

As illustrated in FIG. 11, a second characteristic map in accordance with embodiments. In this case, the characteristic curve 1 is not formed continuously, but rather stepped, i.e., having ranges of constant power. The phases in which the fuel cell is operated over a longer time at constant power and therefore without dynamic response thus lengthen. Hysteresis characteristic curves like characteristic curve 2 and characteristic curve 3 from FIG. 9 are not illustrated in this graphic, but would also be possible. Reference 76 represents max FC power, reference 77 represents min FC power, reference 78 represents requested fuel cell power, reference 79 represents driver power request, and reference 80 represents max powertrain system power.

As illustrated in FIG. 12, a second characteristic map in accordance with embodiments. The fuel cell has an optimum efficiency range (best ETA). Therefore, the characteristic curve 1 can be defined as a function (f (driver command)) so that it is operated as long as possible in this range of optimum efficiency. The characteristic curve 1 therefore has a longer horizontal extension of the calculated requested power for a relatively large range of the power request by the driver. The hysteresis characteristic curves 2 and 3 are again not illustrated in this graphic, but are possible. Reference 81 represents requested fuel cell power, reference 82 represents max FC power, reference 83 represents min FC power, reference 84 represents driver power request, reference 85 represents max powertrain system power, reference 86 represents best η, and reference 87 represents zone of best efficiency.

Input variable (x axis) of the second characteristic curve is in each case the filtered power request over X seconds, i.e., a present power demand existing over a third defined observation time range. In addition, the charge state of the power accumulator (SOC of the HV battery) can be used as the input variable. Depending on the parameterization of the characteristic curve from the second characteristic map, it can occur, as a result of the characteristic curve parameterization itself or also as a result of the hysteresis, that the average power demand is greater than the power request at the fuel cell. This would result in an additional discharge of the HV battery. Under the aspect of the goal conflict of the operating strategy between power provision, efficiency, and service life, this is desired. However, a state of excessively low HV battery charge state has to be avoided. Therefore, the power request at the fuel cell (second characteristic map) is particularly additionally influenced by the superposition with a characteristic curve, which is dependent on the SOC of the power accumulator (FIG. 13).

As illustrated in FIG. 13, if 2D characteristic maps can be implemented in the control unit of the hybrid vehicle, the second characteristic map, in all variations illustrated—can also be displayed depending on the charge state of the power accumulator (HV battery SOC). Reference 88 represents requested fuel cell power, reference 89 represents max FC power, reference 90 represents min FC power, reference 91 represents driver power request, reference 92 represents max powertrain system power, reference 93 represents HV battery SOC, reference 94 represents min usable SOC, and reference 95 represents max usable SOC.

As illustrated in FIG. 14, if an implementation of 2D characteristic maps in the control unit is not possible or is not desired, a superimposed characteristic curve, referred to hereafter as a third characteristic curve or third characteristic map or characteristic map C, can also be implemented. This third characteristic curve describes the calculated requested power as a function of the charge state of the power accumulator (HV battery SOC). Reference 88 represents requested fuel cell power, reference 89 represents max FC power, reference 90 represents min FC power, reference 93 represents HV battery SOC, reference 94 represents Min usable SOC, and reference 95 represents Max usable SOC.

The final power request at the fuel cell then results from the maximum of the requested power from the third characteristic map and the third characteristic curve/third characteristic map/characteristic map C. The parameterization of the third characteristic curve itself (linear, stepped, etc.) can be freely selected in this case. In addition to the base characteristic curve 4, a hysteresis characteristic curve 5 can be implemented, to also reduce the dynamic response of the fuel cell here.

As illustrated in FIG. 15, a possible interaction of modules in a control device of the hybrid vehicle. The controller, for determining the input variables, has a module for determining the reference power (present power demand) M1 and a module for filtering the vehicle velocity M2, and a detection of the charge state of the power accumulator (HV battery SOC) M3. On the basis of the values determined by M1 and M2, a module for the first characteristic map (characteristic map A) M4, which can contain a flow chart for a timer according to FIG. 8, can establish the activation or deactivation of the fuel cell. On the basis of the values determined by M2 and M3, a module for the second characteristic map (characteristic map B) M5, together with a module, which is supplied by M3, for the third characteristic curve/third characteristic map/characteristic map C, namely M6, can establish which power is actually requested by the fuel cell.

Reference 96 is a module representing filter vehicle velocity, reference 97 is a module representing determine reference power, reference 98 is a module representing characteristic map A (including flow chart for superimposed timer), reference 99 is a module representing characteristic map B (including flow chart for superimposed timer), reference 100 is a module representing characteristic map C, reference 101 represents if characteristic map C is provided. Omitted if characteristic map B is parametrized as a 2D characteristic map, reference 102 represents start/stop, reference 103 is a module representing MAX(B,C), reference 104 is a module representing fuel cell, reference 105 represents setpoint power, and reference 106 represents HV battery SOC.

As illustrated in FIG. 16, an example of the result to which a method in accordance with embodiments may provide. The actual power requested by the fuel cell in an operating strategy which is routine in the prior art for the fuel cell is illustrated (dashed lines), which has a high dynamic response, turning on and off the fuel cell often, and frequently rising and falling requested powers, and a fuel cell controlled by a method according to the invention (continuous line). The result according to the invention illustrates substantially lower dynamic response of the power request, substantially fewer activation and deactivation procedures of the fuel cell, and essentially continuous operation of the fuel cell at constant power and rarely changing the requested power level. Reference 107 represents power of fuel cell, reference 108 represents time, reference 109 represents NOT optimum operating strategy of a fuel cell represents highly dynamic operation and turning on/off cycles, reference 110 represents Goal: optimum operating strategy of a fuel cell: low dynamic response, constant power over long range, average power, efficiency optimum, if possible only activate once a trip, reference 111 represents fuel cell remains off, travel from battery, reference 112 represents activate fuel cell, average power, efficiency optimum, reference 113 represents Fuel cell remains active, recharge battery, reference 114 represents Power provision in the case of high driver command, and reference 115 represents And so on: adapt power according to efficiency, battery SOC, driver command.

Embodiments therefore overall enable the control of a fuel cell on the basis of characteristic maps, as a function of a driver command power and the vehicle velocity, particularly superimposed with hysteresis, to turn the fuel cell on and off as little as possible and to reduce the dynamic response and finally to find the best compromise between power provision and efficiency.

The term "coupled," or "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A method for operating a fuel cell of a hybrid vehicle having an electric drive having a power accumulator configured to charge the fuel cell, the method comprising:
activating and deactivating the fuel cell as a function of a first characteristic map having a first input variable representing a present power demand of the hybrid vehicle which exists over a first defined observation time range, a second input variable of representing a present charge state of the power accumulator, and a third input variable representing a present vehicle velocity.

2. The method of claim 1, wherein the first defined observation time range comprises between 1 second and 5 minutes.

3. The method of claim 1, wherein the first defined observation time range comprises between 1 second and 60 seconds.

4. The method of claim 1, wherein the first defined observation time range comprises between 3 and 20 seconds.

5. The method of claim 1, wherein the present vehicle velocity comprises a vehicle velocity existing over a second defined observation time range.

6. The method of claim 5, wherein the second defined observation time range comprises between 1 second and 5 minutes.

7. The method of claim 5, wherein the second defined observation time range comprises between 1 second and 30 seconds.

8. The method of claim 5, wherein the second defined observation time range comprises between 2 and 20 seconds.

9. The method of claim 1, wherein the first characteristic map has at least one first hysteresis, so that the characteristic curve for activating the fuel cell as a function of the first input variable is different from the characteristic curve for deactivating the fuel cell as a function of the first input variable.

10. The method of claim 1, wherein the fuel cell is operated at a requested power when the fuel cell is activated, which is a function of a second characteristic map.

11. The method of claim 10, wherein a first input variable of the second characteristic map comprises a present power request by a driver of the hybrid vehicle.

12. The method of claim 10, wherein the first input variable of the second characteristic map comprises a present power request existing over a third defined observation time range.

13. The method of claim 10, wherein the second characteristic map has at least one first hysteresis, so that the characteristic curve for increasing the requested power of the fuel cell as a function of the first input variable is different from the characteristic curve for reducing the requested power of the fuel cell as a function of the first input variable.

14. The method of claim 10, wherein the characteristic curve for increasing the requested power of the fuel cell as a function of the first input variable is formed stepped.

15. The method of claim 10, wherein a second input variable of the second characteristic map comprises a present charge state of the power accumulator.

16. A hybrid vehicle, comprising:
an electric drive;
a power accumulator for the electric drive;
a fuel cell configured to charge the power accumulator; and
a control unit having logic, at least partially comprising hardware configured to:
activate and deactivate the fuel cell as a function of a first characteristic map having a first input variable representing a present power demand of the hybrid vehicle which exists over a first defined observation time range, a second input variable of representing a present charge state of the power accumulator, and a third input variable representing a present vehicle velocity.

17. A hybrid vehicle, comprising:
an electric drive;
a power accumulator for the electric drive;
a fuel cell configured to charge the power accumulator; and
a control unit operatively connected, the control unit having logic, at least partially comprising hardware configured to:
operate the fuel cell, when activated, as a function of a characteristic map having a first input variable representing a present power request by a driver of the hybrid vehicle, the characteristic map also having at least one first hysteresis, so that a first characteristic curve for increasing the present power request of the fuel cell as a function of the first input variable is different from a second characteristic curve for reducing the requested power of the fuel cell as a function of the first input variable.

\* \* \* \* \*